United States Patent

Adahan

[11] 3,820,856
[45] June 28, 1974

[54] AIR BRAKE PRESSURE MODULATOR
[76] Inventor: Carmeli Adahan, 1930 Vine St., No. 303, Berkeley, Calif. 94709
[22] Filed: Nov. 10, 1972
[21] Appl. No.: 305,333

[52] U.S. Cl............................ 303/21 F, 303/6 C
[51] Int. Cl............................................ B60t 8/06
[58] Field of Search............ 303/6 C, 21 F, 61, 62, 303/63; 188/181 A; 137/627.5; 138/45

[56] References Cited
UNITED STATES PATENTS

| | | | |
|---|---|---|---|
| 2,728,355 | 12/1955 | Dahl | 138/45 |
| 2,815,041 | 12/1957 | Rimsha et al. | 138/45 |
| 3,552,802 | 1/1971 | Packer et al. | 303/61 |
| 3,560,056 | 2/1971 | Stelzer | 303/21 F |
| 3,655,246 | 4/1972 | Keller | 188/181 A |
| 3,667,811 | 6/1972 | Okamoto et al. | 303/21 F |
| 3,717,385 | 2/1973 | Michellone et al. | 303/21 F |
| 3,719,401 | 3/1973 | Peruglia | 303/21 F |
| 3,724,914 | 4/1973 | Skoyles | 303/21 F |

FOREIGN PATENTS OR APPLICATIONS
1,915,704 10/1970 Germany..................... 303/21 F Primary Examiner—Duane A. Reger
Assistant Examiner—Galen L. Barefoot
Attorney, Agent, or Firm—Irvin L. Groh

[57] ABSTRACT

A brake pressure modulator for use in an air brake system on motor vehicles which also includes an antiskid control system for detecting actual or potential locking of the braked wheels. The brake pressure modulator is disposed in the control line and regulates the pressure in that line to control the release and reapplication of the brakes either directly when the control line is used to deliver air to the brake actuating chambers at the wheels or indirectly when the control line pressure is utilized to operate a relay valve which controls the delivery of brake applying air to the brake chambers at the wheels.

7 Claims, 4 Drawing Figures

AIR BRAKE PRESSURE MODULATOR

BACKGROUND OF THE INVENTION

1. Field of the Invention

This invention relates to brake pressure modulators for use in antiskid systems and, more particularly, to a brake pressure modulator for use in the control line of air brake systems.

2. Description of Prior Art

Air brake systems employ a source of compressed air which is constantly being depleted during braking operations so that the pressure of the air must be reestablished. Air pressure control devices used in control arrangments for air brake systems to automatically release and reapply the brake by relieving and reapplying air pressure often utilize large quantities of pressurized air very inefficiently or the pressure control is so complex and expensive as to be prohibitive for use. Devices which release the air pressure being delivered to the brake chambers actuating the brakes at the wheels upon the occurrence of an incipient wheel lock usually release the brakes beyond the point at which the wheel lock condition disappears and, as a consequence, use a large quantity of air. Moreover, the over release of the brakes requires a reapplication from the over-released point which further depletes the supply of air unnecessarily and increases the vehicle stopping distance. Upon reapplication of the brakes following their release in response to a potential wheel locking situation, the control line is opened to the full pressure being demanded by the operator and, as a consequence, the brakes are usually reapplied at an excessively high pressure level and so rapidly that the brakes tend to reach the locked condition. As a consequence, the brakes are applied beyond the point which affords efficient control to further drain the air supply system unnecessarily and increase the stopping distance.

Devices which are employed to avoid repeated release and reapplication of the brakes beyond the respective levels which would be effective to properly control skid become extremely complex and employ a multiplicity of components which not only increases the cost of the system but inhibits normal brake application.

It is an object of the present invention to provide an air brake modulator which may be disposed in a control line delivering air directly to the brake applying chambers or in a control line delivering air to a relay valve for indirectly controlling the air pressure to the brake chambers.

It is a further object of the invention to provide an air brake pressure modulator which is actuated by a signal indicating the presence of an impending wheel lock condition to release the pressure applying the brakes at a controlled rate and to increase the pressure for reapplying the brakes following termination of the wheel lock condition at another controlled rate, with both of the rates being related to the pressure applying the brakes at the time the cycle was initiated.

Still another object of the invention is to provide an air brake pressure modulator in which the pressures are controlled so that the rate of brake released during an antiskid cycle is initially rapid and subsequently gradual and in which the rate of brake reapplication during such a cycle is initially rapid and subsequently gradual, the rates of release and reapplication being effective to avoid over release or over reapplication of the brakes.

It is still another object of the invention to provide an air brake pressure modulator which may be used with a wide variety of skid control circuits and which is economical and commercially feasible to use and manufacture and which is durable, efficient and reliable in operation.

In accordance with the present invention, a brake pressure modulator is provided for use in the control line of an air brake system in which the brake pressure is released in response to a skid signal at an initially rapid rate followed by a more gradual rate which is dependent on the brake pressure level at which the brakes were being applied at the time that the wheel lock signal was received. Upon termination of the signal, following sufficient release of the brake pressure to insure wheel rotation, the brakes are automatically reapplied by increasing the brake pressure at an initially rapid rate which is established by the magnitude of the brake pressure at the time when the prior skid signal was received. This initial rate of pressure increase and brake reapplication is followed by a more gradual brake pressure increase as a subsequent wheel locking condition is approached with the gradual brake pressure increase being determined by the degree of brake pressure being demanded by the operator of the vehicle. The rapid rates of release and reapplication are effective in shortening the stopping distance of the vehicle by rapidly bringing the system to the points at which the wheel lock condition is ready to be eliminated or at which the wheel lock condition is approaching. The more gradual rates of release and reapplication following the rapid rates are effective to provide brake release and reapplication which avoids operation beyond the points at which the brakes would be effectively released or effectively reapplied to avoid inefficient utilization of the air pressure supply and to avoid unnecessarily long stopping distances.

DETAILED DESCRIPTION

Figure 1:
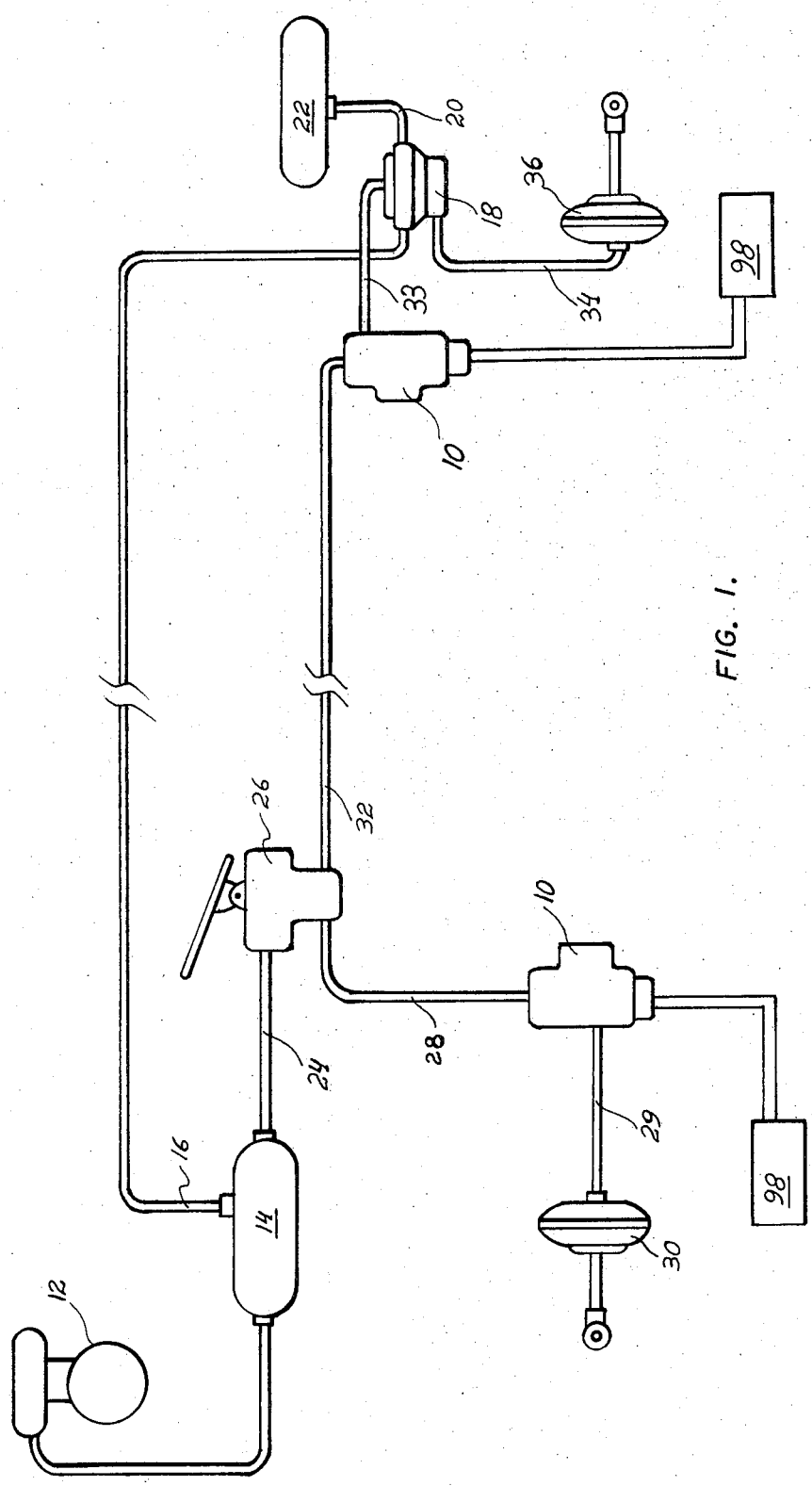
FIG. 1 is a schematic view of an air brake system including air brake pressure modulators embodying the present invention.

The brake pressure modulator 10 embodying the present invention is adapted for use in a pneumatic brake system and the principal components of a typical pneumatic brake system for use on tractor-trailer vehicles are illustrated in FIG. 1. The system includes a compressor 12 which delivers compressed air to a reservoir 14 normally carried by the tractor. Air from the reservoir 14 is delivered through a relatively long line 16 to a relay valve 18 and from the latter through a line 20 to a reservoir 22 conventionally mounted on the trailer portion of the vehicle.

Air from reservoir 14 is supplied through a line 24 to a conventional treadle or foot valve 26 which is under the control of the operator to deliver compressed air through a line 28, 29 to brake actuating chambers 30, only one of which is shown, and conventionally associated with the brakes at the front wheels of the vehicle. Such actuation of the foot valve 26 also is effective to deliver air from the reservoir 14, through the foot valve 26 and through a relatively long line 32, 33 to the relay valve 18. This pressurized air operates the relay valve 18 to cause air from the reservoir 22 to be delivered through the relay valve 18 and a line 34 to actuate conventional brake chambers 36, only one of which is shown, associated with the brakes on wheels at the rear of the vehicle, for example, on the trailer.

The air brake pressure modulator 10 embodying the present invention may be disposed in the line 28, 29 between the foot valve 26 and the brake chamber 30 or in the relatively long line 32, 33 between the foot valve 26 and the relay valve 18. When disposed in the line 28, 29, the pressure modulator 10 is effective to directly control the pressure in the brake chamber 30 and when installed in the line 32, 33, the pressure in the brake chamber 36 is controlled indirectly through the relay valve 18.

Figure 2:
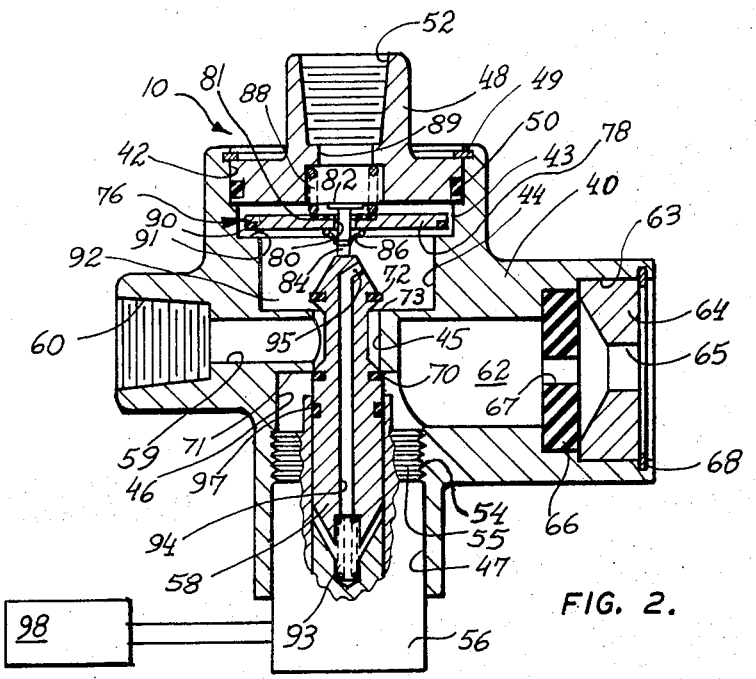
FIG. 2 is a sectional view showing the brake pressure modulator in one condition of operation.

Referring to the drawings and particularly to FIG. 2, the air brake pressure modulator 10 includes a housing 40 having an elongated stepped bore which includes a plurality of interconnected bore portions 42 through 47 of varying sizes. The upper bore portion 42 receives a cap member 48 which is held in position against a shoulder formed between the bore portion 42 and 43 by a snap-ring 49. The cap member 48 is provided with a seal 50 which engages the walls of the bore portion 42 to maintain the cap member in fluid tight relationship with the rest of the housing 40. The cap member 48 forms an inlet port 52 which is adapted to be connected with either line 28 or the line 32 to the foot valve 26 as seen in FIG. 1.

The bottom bore portion 47 is provided with internally threaded wall 54 which is adapted to cooperate with the external threads 55 formed on the exterior of a solenoid 56. The solenoid 56 serves to close the bottom of the stepped bore of the housing 40 and is provided with a slidable armature or plunger 58 which extends upwardly in the bore portions 44, 45 and 46.

The intermediate bore portion 45 communicates by way of a passage 59 with an outlet port 60 formed in the side of the housing 40. The outlet port 60 is adapted to be connected, as shown in FIG. 1, by way of the air line 29 to the brake chamber 30 or by way of the air line 33 with the relay valve 18 which controls the pressure in the brake chamber 36.

The bore portion 46 immediately above the solenoid 56 is open to a relatively large chamber 62 extending radially from the axis of the stepped bore 41. An enlarged bore portion 63 adjacent one end of the chamber 62 receives an annular cap member 64 having a central aperture 65 which forms an exhaust port communicating the interior of the housing 40 with the atmosphere. An annular resilient element 66 having a central aperture 67 is seated in the bore portion 63 against the shoulder formed between the latter and the bore forming the chamber 62 and is held in position by the cap member 64 which in turn, is held in a fixed position by a snap-ring 68.

The plunger 58 of the solenoid 56 is provided with a sealing element 70 which, as shown in FIG. 2, is seated on an annular shoulder 71 formed between the intermediate bore portion 45 and the relatively larger bore portion 46. Similarly, a sealing element 72 is carried by the upper end of the plunger 58 and is adapted upon downward movement of the latter, to seat on an annular shoulder 73 formed between the intermediate bore portion 45 and a relatively larger bore portion 44. In the position shown in FIG. 2, the seal element 72 is spaced from the shoulder 73 to form an open valve permitting communication between the bore portions 44 and 45. At the same time, the seal element 70 is seated on the shoulder 71 to form a closed valve isolating the bore portions 45 and 46 from each other. Upon downward movement of the solenoid plunger 58, the valve 72, 73 will close to isolate the bore portions 44 and 45 from each other and, simultaneously, the valve 70, 71 will open to place the bore portion 45 in communication with the bore portion 46 and the chamber 62.

Figure 3:
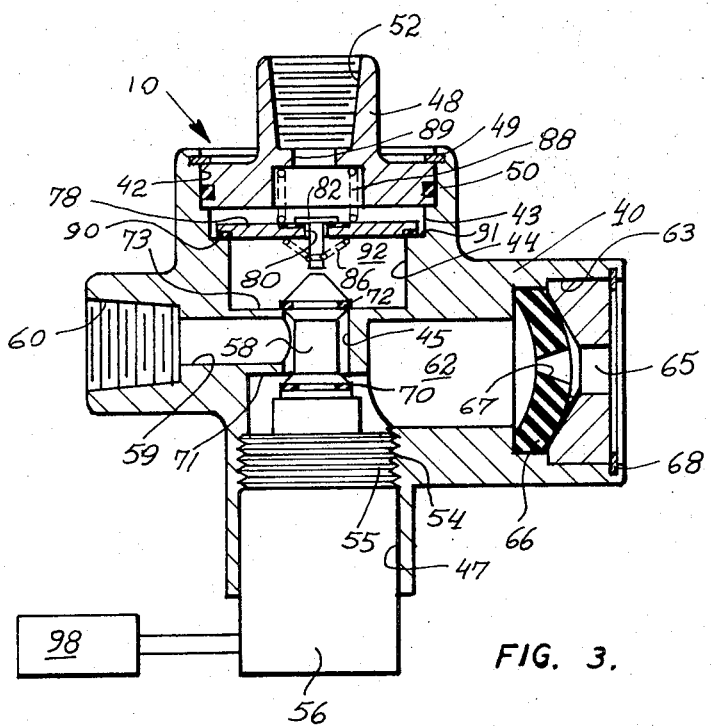
FIG. 3 is a sectional view similar to FIG. 2 showing another condition of operation of the modulator.

A control valve assembly 76 is disposed in the bore portion 43 immediately above the upper end of the solenoid plunger 58. The control valve assembly 76 includes a relatively large disc element 78 having a central aperture 80. The central aperture 80 is surrounded by an annular seal element 81 which, in the position shown in FIG. 3, is engaged by the head portion of a valve element 82 to close the aperture 80. The valve element 82 has a stem portion 84 which passes through the aperture 80. A conical spring 86 has its upper end seated against the disc valve element 78 and its lower end is seated on the valve stem 84 to urge the valve element 82 to the illustrated position closing the central aperture 80. The control valve assembly 76 is urged downwardly to the position shown in FIG. 2 by a relatively light spring 88 seated in a passage 89 communicating the bore portion 43 with the inlet 52. The valve assembly 76 is positioned within the bore portion 43 with the bottom end of the valve stem 84 in engagement with the upper end of the solenoid plunger 58 and with the various surfaces of the disc element 78 spaced from the walls of the bore 43 and from the end cap 48 so that air admitted at the inlet 52 is free to flow, unobstructed, to the bore portion 44 and through the open valve 72, 73 to the outlet port 60. Upon downward movement of the solenoid plunger 58, the valve assembly 76 is permitted to move downwardly so that a circumferential seal 90 mounted in the lower surface of the disc element 78 engages an annular shoulder 91 between the bore portions 43 and 44. In the closed position of the valve assembly 76 and the valve 72, 73, the bore portion 44 forms a memory chamber 92 which will be more fully described and which is completely isolated from the various ports 52, 60 and 65.

The solenoid plunger 58 is normally urged upwardly to the position shown in FIG. 2 by a spring 93. The cavity in which the spring 93 is disposed communicates with the chamber 92 formed by the bore portion 44 by way of an elongated passage 94 in the solenoid plunger 58 and through radial passage 95 at the upper end of the solenoid plunger. The solenoid plunger 58 is also provided with a seal 97 which prevents leakage of air through the solenoid 56. The arrangement of the seals and passages exposes the opposite ends of the plunger 58 to the same pressure so that the latter is balanced and free to slide independently of the relatively high and variable pressures which may be delivered to the inlet port 52.

The solenoid 56 is de-energized and energized to move the solenoid plunger 58 between the position shown in FIGS. 2 and 3, in response to the presence or absence of an electric signal from an antiskid sensing means 98 which is indicated schematically in FIGS. 1, 2 and 3. Such a sensing means 98 may be any one of a variety of such means responsive to vehicle or wheel deceleration or to wheel slip. A sensing device which develops a signal in response to an impending wheel lock and which terminates the signal when the braked wheel resumes sufficient rotation to avoid the wheel locking condition is preferred. Such a sensing means may be of the type described in my co-pending U.S. Pat. application, Ser. No. 83,811 filed Oct. 26, 1970, now U.S. Pat. No. 3,719,399 for Acceleration Control Module.

Under normal operating conditions of the vehicle brake system, the various components of the brake pressure modulator 10 occupy the position illustrated in FIG. 2 during operation of the foot valve 26 during both application and release of the brakes by operation of the brake chambers 30 and 36. The pressure level established at the inlet 52 in response to operation of the foot valve 26 also is established at the outlet port 60 due to the fully open position of the control valve assembly 76 and the open valve 72, 73. Consequently, braking operations at pressure levels which are not likely to produce wheel lock are conducted in the same manner as if the brake pressure modulator 10 was not installed in the air brake system.

Under conditions in which the brakes are being applied and an impending wheel lock condition is sensed by the skid control device 98, the solenoid 56 will be energized and cause the plunger 58 to move downwardly against the biasing action of spring 93. Such movement closes the valve 72, 73 and at the same time, opens the valve 70, 71 as seen in FIG. 3. This action is operative to isolate the outlet port 60 from the inlet port 52 and, at the same time, to place the outlet port 60 in communication with the exhaust port 65 by way of the chamber 62 and orifice 67. Downward movement of the plunger 58 also permits the valve disc element 78 to move downwardly so that seal 90 engages and seats on the shoulder 91. The valve disc element 78 is urged downwardly by the spring 88 and the pressure being delivered to the inlet port 52. The metering valve formed by the aperture 80 and valve element 82 remains closed and, as best seen in FIG. 3, the memory chamber 92 formed in the bore portion 44 is isolated from the inlet port 52 and from any additional increase in pressure which might otherwise be supplied from the foot valve 26. Downward movement of the solenoid plunger 58 also closes the valve 72, 73 to isolate the memory chamber 92 from the outlet port 60. As a result, a volume of air is confined in the memory chamber 92 at a pressure which was being delivered to the modulator 10 at the time a wheel lock was sensed. This volume of pressure is stored for subsequent use as will be described later. At the same time that valve 72, 73 closes, the valve 70, 71 opens the pressure of the air which was being supplied to the braking system through the outlet port 60 drops rapidly because the air escapes to the cavity 62 which is at atmospheric pressure. This increases the pressure in the chamber 62 which may be considered a brake release control chamber and causes a pressure differential across the resilient element 66 which deflects it toward the position shown in FIG. 3. The deflection of the element 66 restricts the size of the aperture 67 and, as a consequence, subsequent exhausting of pressurized air from the outlet port 60 occurs at a slower rate. This drop in pressure is inversely proportional to the pressure in the brake release control chamber 62, that is, the greater the pressure the greater the deflection of the resilient element 66 and, consequently, the greater restriction to the aperture 67. Following energization of the solenoid, the drop of the brake applying pressure at the outlet port 60 is initially rapid and subsequently slower resulting in an initially rapid release of the brakes followed by a slower release of the brakes.

When the brakes have been released sufficiently so that the impending wheel lock condition is avoided and the wheel resumes normal rotation, the signal from the skid control sensing means 98 will be terminated and the solenoid 56 will be de-energized. As a consequence, the spring 93 urges the solenoid plunger 58 upwardly to return the valve 70, 71 to a closed position which isolates the outlet port 60 from the exhaust port 65. Simultaneously, the valve 72, 73 is opened to place the memory or brake applying control chamber 92 in communication with the outlet port 60. Closing of the valve 70, 71 will prevent any further drop in pressure at the brakes and, at the same time, opens the memory chamber 92 to the outlet port 60 and to the brakes. The valve disc 78 will remain in its seated position due to the continued delivery of pressurized air to the inlet port 52 by the operation of the foot valve 26. The pressure of the air which has been trapped in the memory chamber 92 is the same as the pressure of the air which was being delivered to the inlet port 52 at the time that the impending wheel lock condition was detected and the solenoid 56 was energized. This volume of relatively high pressure air will cause an initially rapid increase in the pressure of the air at the outlet port 60 for initiating reapplication of the brakes. With the valve disc 78 seated as seen in FIG. 3, the return movement of the solenoid plunger 58 in an upward direction will also cause engagement with the stem 84 to open the valve element 82 and permit a relatively restricted admission of pressurized air from the inlet 52 through the open metering aperture 80 to the chamber 92 and to the outlet port 60. This pressure increase, however, is at a slower rate because of the metering effect of the opened aperture 80. As a consequence, de-energizing the solenoid 56 following termination of the wheel lock condition will result in an initially rapid increase in pressure at the outlet port 60 due to the volume of high pressure air from the memory chamber 92 followed by a slower increase in pressure because of the additional air being delivered from foot valve 26 and metering through the open aperture 80 in the valve disc element 78 which remains closed on its seat 91. As a result, the brakes of the system associated with the outlet port 60 will be reapplied at an initially rapid rate followed by a slower rate.

After the brakes have been released due to the first impending wheel lock condition followed by automatic reapplication of the brakes when the lock condition is terminated, a subsequent wheel lock condition will cause solenoid 56 to be energized again to move the plunger 58 downwardly, permitting the valve element 82 to close the aperture 80 and, at the same time, valve 72, 73 will close and valve 70, 71 will open. This isolates the memory chamber 92 from the outlet port 60 and at the same time, places the outlet port 60 in communication with the chamber 62 for release of the brakes as described above. When the brakes have been released sufficiently, the solenoid 56 is again de-energized and memory chamber 92 will again be placed in communication with the outlet port 60 to afford an initially rapid pressure increase and the open orifice 80 will permit a subsequent slow increase in the pressure at the outlet 60 and, consequently, at the brake chambers 30 and 36. The full cycle of brake release and brake application will continue until the vehicle comes to a stop or until the operator releases the foot valve 26 to release the control pressure being delivered to inlet port 52. Release of pressure at inlet port 52 permits valve assembly 76 to return to the position illustrated in FIG. 2 to place the air brake pressure modulator 10 in a condition for brake application under the control of the vehicle operator.

Figure 4:
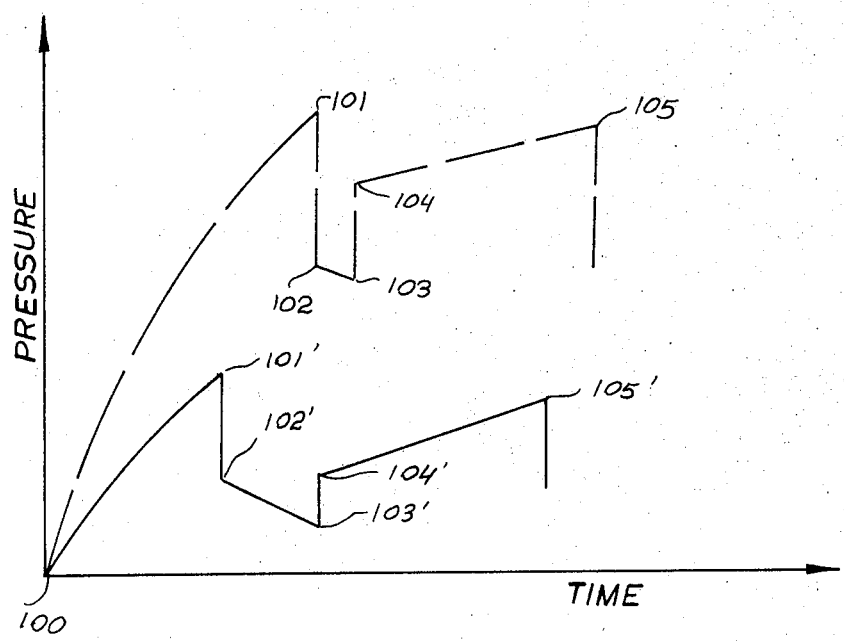
FIG. 4 is a graph depicting the relationship of the pressure being controlled over a period of time under different conditions of operation.

FIG. 4 illustrates the relationship of air pressure at the outlet port 60 and, consequently, at the brakes in terms of time during application of the brakes through a skid control cycle. The initial pressure from point 100 to 101 is under the control of the operator and is dependent upon the degree of actuation of the foot valve 26. If the pressure is increased to a point where the braking results in an impending wheel lock condition, the solenoid 56 will be actuated at point 101 to prevent further increase in pressure from the foot valve 26 by isolating it from the brake pressure modulator 10 by means of the closed valve assembly 76. The relatively rapid drop in pressure from the point 101 to the point 102 occurs during the equalization of pressure in the chamber 62 and the outlet port 60. This causes the pressure in the chamber 62 to increase and to deflect the resilient element 66 to restrict the aperture 67 to result in a relatively slower rate of pressure decrease between the points 102 and 103. Point 103 represents the condition at which the impending wheel lock condition has been terminated and the solenoid is de-energized in response to termination of the antiskid signal from the acceleration control module 98. This causes reapplication of the brakes at a relatively rapid rate between the points 103 and 104 as a result of the relatively high pressure which was trapped in the memory chamber 92 at the time the solenoid was energized at point 101. The subsequently slower pressure increase between the points 104 and 105 is the result of pressure from the foot control valve 26 being supplied to the inlet port 52 and through the open metering aperture 80 to the memory chamber 92 and to the outlet port 60. Point 105 represents the energization of the solenoid 56 in response to a second impending wheel lock signal which results in a repetition of the prior cycle but at lower pressure levels.

The curve 100, 101' through 105' corresponds to the curve described above but is representative of conditions that might be experienced at much lower pressure levels, for example, on slippery surfaces such as ice when the wheel would tend to lock at much lower pressures and a greater period of time would be required to release the brakes to avoid locking. In particular, it should be noted that the rapid pressure drop between points 101' and 102' is over a smaller range than between points 101 and 102 and, in like manner, the rapid pressure increase between points 103' and 104' is of lesser magnitude than between the points 103 and 104 which indicates the responsiveness of the modulator 10 to the pressure levels at which its operation is initiated during a skid control cycle.

It will now be seen that an air brake pressure modulator for an antiskid system has been provided in which brakes on a vehicle are automatically released and applied in response to signals from an antiskid sensing means by reducing and increasing the pressure of air being supplied to the brakes in which the rate of brake release and brake application is initially fast and subsequently slow with the initial fast rate being dependent on the pressure being supplied to the brakes at the time that the signal of an impending wheel lock was received. Such operation establishes the pressure levels very near to the levels at which the brakes are released sufficiently so that the wheels resume satisfactory rotation or applies the brakes to a level approaching a wheel lock condition so that the subsequent slow rates of release and application approach the critical pressure levels without exceeding them.

While a preferred embodiment of the invention has been shown and described, it will be understood that various changes and modifications can be made without departing from the spirit of the invention.

What is claimed is:

1. In a pneumatic brake system having antiskid means for sensing an impending wheel lock condition and the termination of said lock condition and an operator actuated control for delivering pneumatic pressure to the pressure actuated brake system associated with at least one wheel of a vehicle, a brake pressure modulator including a housing having inlet, outlet and exhaust ports adapted to communicate with said operator actuated control, said brake system and the atmosphere, respectively, valve means movable between a first position normally communicating said inlet port with said outlet port and isolating the latter from said exhaust port for delivering brake applying pressure to said outlet port and a second position communicating said outlet port with the exhaust port and isolating said inlet port to relieve brake applying pressure at said outlet port, actuator means to move said valve means in response to a signal of an impending wheel lock or termination of a wheel lock, additional valve means between said inlet port and said valve means and being movable by said valve means from an open to a closed position in response to movement of said valve means to said second position following a first signal of an impending wheel lock to isolate said inlet port from said valve means, said additional valve means being maintained in said closed position in response to the presence of pressure in said inlet port, and metering valve means disposed between said inlet port and said outlet port, said metering valve means being movable from a closed to an open position by said first mentioned valve means when said additional valve means is in said closed position and in response to movement of said valve means to said first position upon termination of said wheel lock condition to communicate said inlet port and said outlet port for gradual increase of said brake applying pressure at said outlet port.

2. The combination set forth in claim 1 in which said housing forms a brake applying control chamber between said valve means and said additional valve means and in which said first named valve means and additional valve means are movable in response to said first signal of an impending wheel lock to isolate said brake applying control chamber from said outlet port and inlet port, and in which said first named valve means and said metering valve means are operative upon said termination of said wheel lock condition to communicate said brake applying control chamber with said outlet port for relatively rapid initial increase of brake applying pressure at said outlet and to communicate said brake applying control chamber through said metering valve means to said inlet port for a subsequently slower increase in brake applying pressure at said outlet port.

3. For use in a pneumatic brake system having means for sensing an impending wheel lock condition and the termination of said wheel lock condition, a brake pressure modulator including a housing having inlet, outlet and exhaust ports adapted to communicate with an operator controlled source of brake applying air pressure, with said brake system and with the atmosphere, respectively, said housing forming a brake applying control chamber between said inlet and said outlet ports and a brake release control chamber between said outlet port and exhaust port, first metering means between said inlet port and said brake applying control chamber, second metering means between said brake release control chamber and said exhaust port, valve means in said housing movable between a first position communicating said brake applying control chamber with said outlet port and closing the latter to said brake release chamber and a second position in which said outlet port is in communication with said brake release control chamber and is closed to said brake applying control chamber, actuator means to move said valve means from said first position to said second position in response to a signal of an impending wheel lock and from said second position to said first position upon termination of said signal, said valve means being movable to said second position for initial rapid decrease of brake applying pressure at said outlet port upon equalization of pressures in said outlet port and said brake release control chamber and subsequent gradual decrease of said brake applying pressure from said brake release control chamber through said second metering means to said exhaust port, said valve means being movable to said first position in response to the termination of said wheel lock condition for initial rapid increase of brake applying pressure at said outlet port upon communication of pressure in said brake applying control chamber with said outlet port and subsequent gradual increase in said brake applying pressure at said outlet port upon communication of the latter with said inlet port through said first metering valve means and said brake applying control chamber.

4. The combination set forth in claim 3 and further comprising additional valve means between said inlet port and said brake applying control chamber, said additional valve means normally being open and being movable to a closed position in response to movement of said first mentioned valve means to said second position to isolate said brake applying control chamber from said inlet, outlet and exhaust ports and maintain the pressure therein at a magnitude equal to the pressure at said inlet port when said signal of an impending wheel lock is received and until said first mentioned valve means is moved from said second position to said first position.

5. The combination set forth in claim 3 and further comprising additional valve means responsive to movement of said first named valve means to said second position and to brake applying air pressure at said inlet port to isolate the latter from said brake applying control chamber.

6. The combination set forth in claim 5 in which said first metering means includes a valve element movable with said first named valve means, said valve element being movable from a closed to an open position upon movement of said first named valve means from said second to said first position for restricted communication between said inlet port and said outlet port and for gradual increase in brake applying pressure.

7. The combination set forth in claim 3 in which said second metering means includes a resilient element forming an open passage between said brake release control chamber and said exhaust port and in which said resilient element deflects in response to pressure in said brake release control chamber to restrict the size of said passage.

* * * * *